Figure 2:
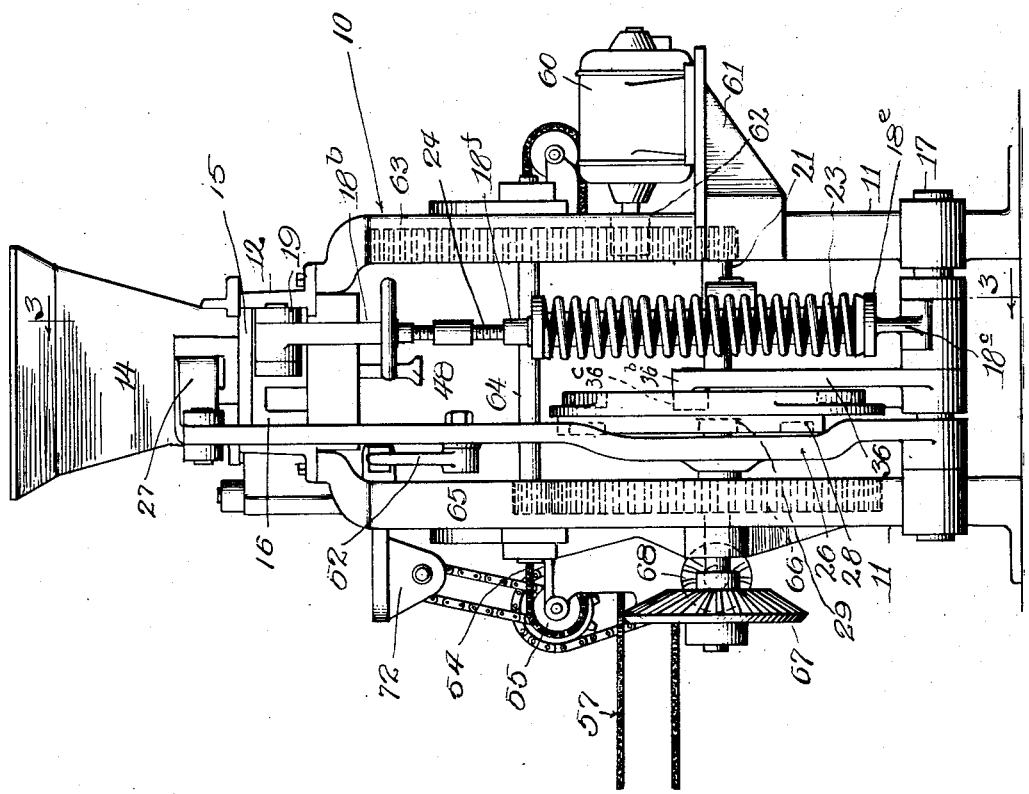

Nov. 3, 1925.

F. STREICH 1,559,805

DOUGH DIVIDER

Filed Sept. 4, 1923

F. STREICH 1,559,805

DOUGH DIVIDER

Filed Sept. 4, 1923

5 Sheets-Sheet 2

Witness:

Inventor
Frank Streich,
By his Atty.

Nov. 3, 1925.
F. STREICH
1,559,805
DOUGH DIVIDER
Filed Sept. 4, 1923
5 Sheets-Sheet 3
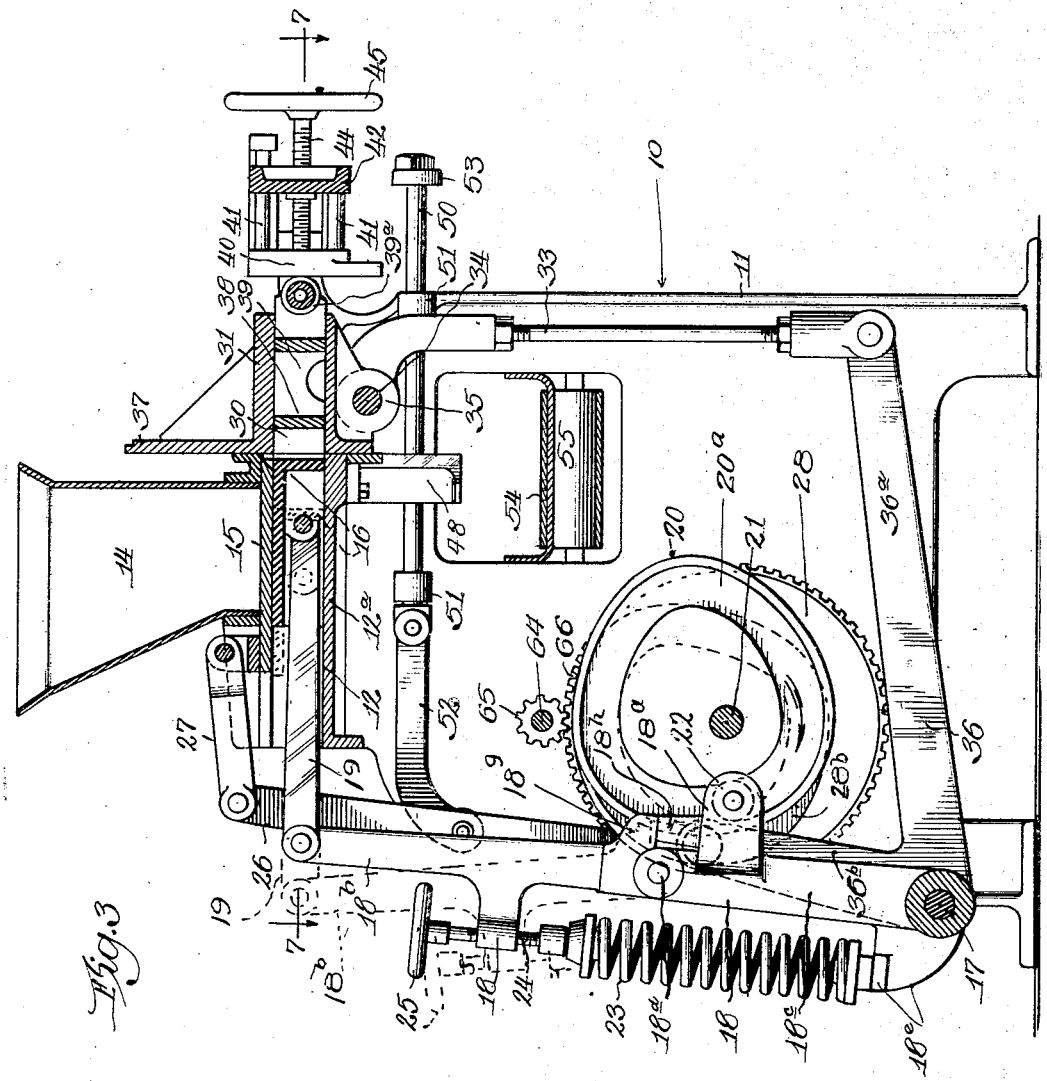
Witness:
Chas. R. Koursh
Inventor,
Frank Streich,
By Charles C. Shervey
his Atty.

Nov. 3, 1925.
F. STREICH
DOUGH DIVIDER
Filed Sept. 4, 1923
1,559,805
5 Sheets-Sheet 4
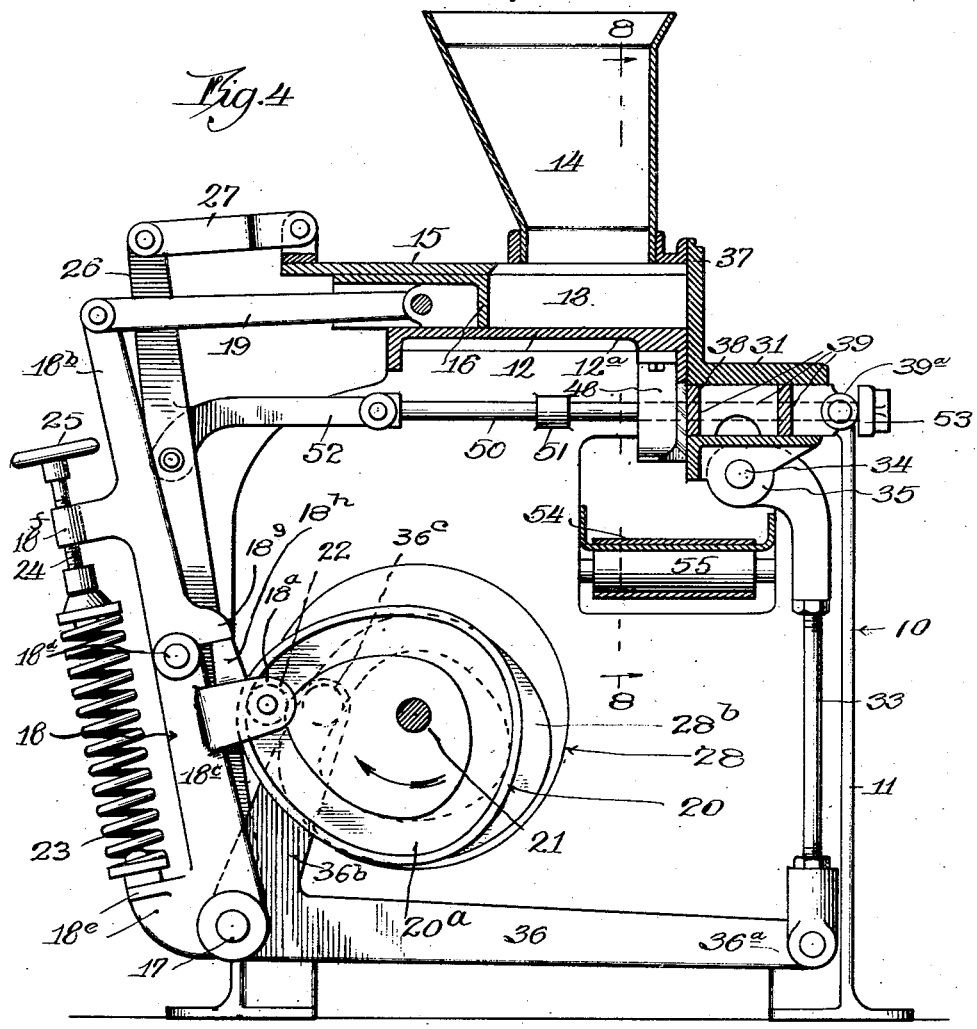
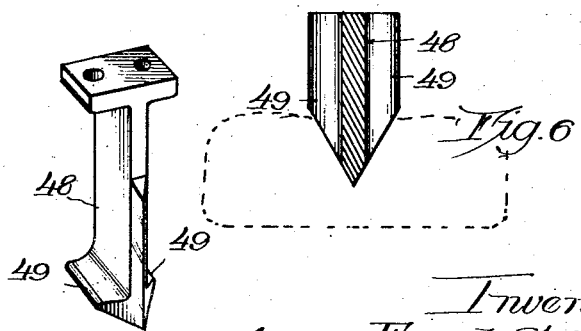

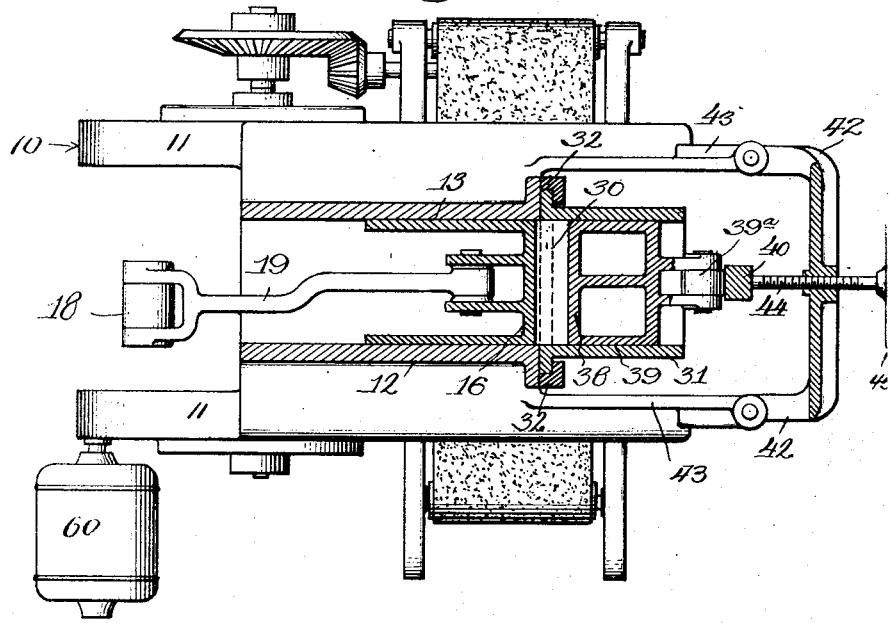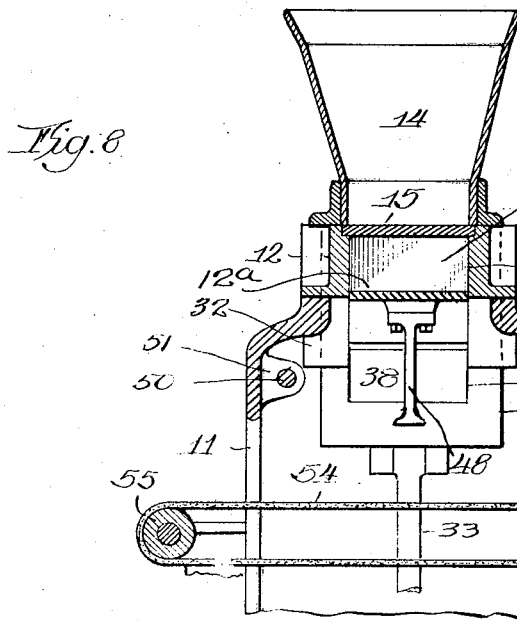

Patented Nov. 3, 1925.

1,559,805

UNITED STATES PATENT OFFICE.

FRANK STREICH, OF JOLIET, ILLINOIS, ASSIGNOR TO UNION MACHINERY COMPANY, OF JOLIET, ILLINOIS, A CORPORATION OF ILLINOIS.

DOUGH DIVIDER.

Application filed September 4, 1923. Serial No. 660,758.

*To all whom it may concern:*

Be it known that I, FRANK STREICH, a citizen of the United States, and a resident of Joliet, Will County, Illinois, have invented certain new and useful Improvements in Dough Dividers, of which the following is declared to be a full, clear, and exact description.

This invention relates to dough dividers and its principal object is to provide improved means for dividing a batch of dough (or other plastic material) into individual lumps of equal weight. Much difficulty has been encountered heretofore, with the use of dividers, because they are not always reliable and often do not divide the dough accurately, with the result that there is a variance in the weight of the loaves of bread. Another difficulty is that in many dividers, and particularly when used in connection with certain kinds of dough, the dough is "killed" while being operated on by the divider.

Among the objects of the present invention, are to provide a dough divider which shall measure the lumps of dough accurately, and which shall divide the dough into lumps without "killing" the dough. Another object is to reduce to a minimum the formation of large air pockets in individual lumps of dough, and to distribute any air pocket (which may form) throughout several loaves, in place of permitting it to be confined to any one loaf.

With these and other objects and advantages in view, this invention consists in the several novel features hereinafter fully set forth and claimed.

The invention is clearly illustrated in the accompanying drawings, in which:

Fig. 1 is a side elevation of a dough divider embodying a simple form of the present invention; Fig. 2 is an end view thereof, looking in the direction of the arrow 2, in Fig. 1. Fig. 3 is a vertical, longitudinal section taken on the line 3—3 of Fig. 2; Fig. 4 is a view similar to Fig. 3, but showing the operative parts in a different position; Fig. 5 is a perspective view of a certain dividing knife employed in the machine; Fig. 6 is a horizontal section thereof; Fig. 7 is a horizontal section taken on line 7—7 of Fig. 3, and Fig. 8 is a vertical cross-section taken on line 8—8 of Fig. 4.

Referring to said drawings, which illustrate one embodiment of the invention, the reference character 10, designates the main frame of the machine, which comprises two spaced side frame members 11, 11, suitably secured together. Stationarily secured upon and extending between the upper ends of the side frame members is a box like casing 12 having a dough receiving chamber 13 therein (see Figs. 4, 7 and 8) open from end to end, and open at its top, above which is a hopper 14, into which the batch of dough is delivered for separation into lumps by the machine. The open bottom of the hopper opens into the dough receiving chamber 13, and a horizontal, reciprocating knife 15 is slidably mounted in guide ways formed in the casing 12, and at certain intervals, during each cycle of operation, said knife closes communication between the hopper 14 and dough receiving chamber 13, and forms a top wall for said chamber. Said knife is reciprocated by means as will be hereinafter described. Slidably mounted to reciprocate in the dough receiving chamber 13 is a charging plunger 16, which is reciprocated in timed relation to the knife 15, and operates to draw dough into the chamber 13, and force it into the measuring pocket 30 (see Figs. 3 and 7) of the machine, as will appear later. The plunger 16 and knife 15 are reciprocated by means which will now be described.

Fulcrumed upon a cross rod 17, secured in the side frame members 11, is a two part jointed, plunger actuating lever 18, the upper end of which is connected to the charging plunger 16 by a link 19. A cam block 20, mounted upon a cam shaft 21, which is journaled in bearing boxes on the side frame members 11, co-operates with a roller 22, mounted on an arm 18ª of the lever 18, to oscillate said lever and thereby reciprocate the charging plunger 16 in the chamber 13. In the operation of the machine a quantity of dough is taken into the chamber 13 during each intake stroke of the plunger 16, and inasmuch as the capacity of the measuring pocket 30 may be varied so as to measure large and small lumps of dough, means have been provided for compensating for variations of the length of stroke of the plunger 16, inspection of the volume of excess dough contained in the dough receiving chamber 13, and not discharged therefrom on the discharge stroke of the plunger 16. In the simple form illustrated, for accomplishing this result, the lever 18 is formed of two parts 18$^b$, 18$^c$, jointed together by a joint 18$^d$ which permits of independent oscillatory movement of the upper part 18$^b$ upon the lower part 18$^c$ of the lever. Interposed between said two parts of the lever is a spring 23, here shown in the form of a coiled compression spring, one end of which abuts against a lug 18$^e$ formed on the lower part 18$^c$ of the lever, and the other end abuts against adjustment means mounted in a lug 18$^f$ formed on the upper part 18$^b$ of the lever. Said lugs 18$^e$, 18$^f$ project laterally from the lever 18 and the spring extends parallel with said lever and operates to yieldingly hold the two parts of the lever in alignment. Lugs 18$^g$, 18$^h$, formed on the two parts of the lever, adjacent its joint 18$^d$, form a stop limiting movement of the two parts of the lever against the action of the spring 23. When the cam 20 moves the lever 18 towards the left, as viewed in Fig. 3, movement of the two parts 18$^b$, 18$^c$ thereof is positive and, as a consequence, movement of the plunger in this direction is positive. When the cam moves the lever 18 toward the right, as viewed in Fig. 4, movement of the lower part 18$^c$ of the lever is positive, but the upper part 18$^b$ thereof is free to yield under the influence of resistance to the plunger 16, great enough to overcome the force of the spring 23. The result is that whenever there is an excess amount of dough contained in the chamber 13, and measuring pocket 30, the plunger 16 may yield under the influence of the spring 23, instead of putting abnormal pressure upon the dough. The adjustment means for the spring 23 is shown as comprising an adjustment screw 24 threaded in the lug 18$^f$ and bearing against a plate which forms the abutment for one end of the spring 23. A hand wheel 25 on one end of the adjustment screw 24 furnishes means for turning it in adjusting the tension of the spring. The cam block 20 contains a cam groove 20$^a$ in which the roller 22 travels, and said cam groove is shaped to reciprocate the lever 18 in timed relation to the other operative parts of the machine, as will be readily understood.

Fulcrumed on the rod 17 is a lever 26 for reciprocating the knife 15. The upper end of said lever 26 is connected to the knife 15 by a link 27. A cam block 28 for reciprocating the knife actuating lever 26 is mounted upon the cam shaft 21 adjacent the cam block 20, and has a suitably shaped cam groove 28$^a$ (see Fig. 1) in which travels a roller 29 mounted on the lever 26. The cam groove 28$^a$ is shaped to reciprocate the knife 15 in timed relation to the movements of the plunger 16, and so as to close the top of the chamber 13, before the plunger 16 moves through any considerable portion of its charging stroke, and to open the passage between the hopper and chamber 13, during the intake stroke of the plunger.

From the foregoing description, it will be understood that during each cycle of operation of the machine, a charge is taken into the dough receiving chamber 13, and all or part of said charge is forced into the measuring pocket 30. Thereafter, the measured dough is moved to a lump dividing knife, and forced over said knife, thereby dividing the measured charge into two equal parts, each of a predetermined volume. This construction of the mechanism for accomplishing this result will now be described.

The measuring pocket 30 is contained in a movable box like dough carrier or receptacle 31 mounted in guide ways 32 at the discharge end of the casing 12 (see Fig. 7). In its present form said dough carrier is mounted to move in a vertical direction, and is reciprocated by a link 33 pivotally secured to its lower side by a pin 34 which is held in ears 35 on the lower side of the carrier. A carrier actuating lever 36, fulcrumed on the rod 17, has one arm 36$^a$ connected to the lower end of the link 33, and has a second arm 36$^b$, on which is a roller 36$^c$ that runs in a suitably shaped cam groove 28$^b$ formed in the cam block 28 on the side thereof opposite to the one containing the cam groove 28$^a$. The cam groove 28$^b$ is shaped to reciprocate the lever 36 in timed relation to the plunger actuating lever 18, to thereby lower the carrier 31 after it has been fully charged, and raise it after its contents have been discharged. The carrier 31 has an upstanding end wall 37 which is contiguous with the discharge end face of the casing 12 and closes the opening in said discharge end whenever the carrier is lowered. In its upper position, the pocket 30 registers with the discharge end of the chamber 13 (see Fig. 3) and remains in such position during the charging stroke of the plunger.

The pocket 30 is formed by the top, bottom and side walls of the carrier, and by the plunger face 38 of an adjustable ejecting plunger 39 which is slidably mounted in the hollow of the carrier 31. Said plunger 39 may be adjusted in the pocket to vary the length thereof and consequently to vary the cubical contents thereof, and an adjustable abutment member 40 is provided for arresting movement of said plunger 39, when the pocket 30 in front of it has been fully charged, it being understood that at the commencement of the charging stroke of the charging plunger 16, the ejecting plunger 39 is located in the forward part of the pocket, it having been moved into this position by the ejecting mechanism, as will be presently explained. The abutment member 40, may be in the form of a block, mounted upon pins 41, guided in a yoke-shaped supporting member 42, mounted on arms 43 formed on the side frame members 11 (see Figs. 1 and 7). An adjustment screw 44 threadedly mounted in the supporting member 42 bears against the abutment member 40 and locates its position. A hand wheel 45 on the screw 44 furnishes means for turning it. A graduated scale 46 carried by the abutment member 40, and a pointer 47 mounted on the supporting member 42 (see Fig. 1), provide means whereby the abutment member 40 may be accurately set to measure lumps or loaves of bread of any given weight.

In order to increase the working capacity of the machine, without increasing the speed of its working parts, the pocket 30 is made large enough to contain sufficient measured dough for two or more loaves, and after the correct amount of dough has been measured in the pocket, it is severed into two or more lumps of equal size and weight. The mechanism for accomplishing this result will now be described.

Secured to and projecting down from the lower wall 12ª of the casing 12 is a vertical dough dividing knife 48, whose cutting edge is located precisely midway between the side walls of the pocket 30. The lower end of the knife 18 is flanged laterally as at 49 (see Figs. 5 and 6), and the cutting faces at the bottom of the knife diverge along said flange portions, as is clearly seen in Fig. 5. The purpose of this arrangement is to cause the lumps of dough, when severed, to separate instead of clinging together.

The ejecting plunger 39 is moved through its ejecting stroke, by an ejector here shown as comprising a rod 50 (see Fig. 3), slidably mounted in ears 51 formed on one side frame member 11, and it is connected to the knife actuating lever 26 by a link 52. The rod 50 has a finger 53 on its free end which is arranged to engage with a roller 39ª on the ejecting plunger 39, at the proper time, and thereby force the plunger through its ejecting stroke, and therewith eject the measured charge of dough from the pocket 30 and across the lump dividing knife 48, whereby the measured charge is divided into two lumps of equal size and weight.

Below the knife 48 is a belt conveyor 54 (see Fig. 8), which is trained over rollers 55, 56, and upon which the several lumps of dough fall when ejected from the pocket 30. Leading away from said conveyor 54, and below it is a second belt conveyor 57, which travels at greater speed than the conveyor 54. This arrangement of discharge ensures complete spacing of the lumps of dough.

The machine may be driven by a belt, or it may be motor driven as desired. I have illustrated a motor 60 for driving it, said motor being mounted on a bracket 61 carried by an end frame member 11 of the machine. Speed reducing gearing between the motor and cam shaft is provided and, as shown, comprises a pinion 62 on the motor shaft, a gear wheel 63 on a counter shaft 64, a pinion 65 on the other end of the counter shaft 64, and a gear wheel 66 on the cam shaft 21. The conveyor belts are driven from the cam shaft by a bevel gear wheel 67 on the cam shaft (see Fig. 1), a bevel pinion 68 on a counter shaft 69, and sprocket wheels 70, 70ª on the counter shaft and roller shafts, over which are trained sprocket chains 71. The usual flour sifter 72 is provided above the conveyor 54, and may be operated from one of the roller shafts by chains and sprocket wheels, as is well understood.

In the operation of the divider, the batch of dough is fed into the hopper 14 by gravity. Assuming the parts to be in the position shown in Fig. 3, the charging plunger 16 and knife 15 remain temporarily at rest, or practically at rest, and the carrier 31 moves downward to the position seen in Fig. 4, with the plunger roller 39ª in contact with the abutment member 40. When the carrier reaches or just prior to the time it reaches the lower end of its stroke, the ejector rod 50 moves forward and the finger 53 thereof engages the plunger roller 39ª and moves the plunger 39 forward, thereby ejecting the charge of dough from the pocket 30 and forcing it across the knife 48 and dividing it into two lumps. The two lumps of dough separate as they are severed, and fall upon the conveyor belt 54, which carry them to the second and speedier belt 57, upon which they fall and are further separated from each other and conveyed away. During portions of the down and up stroke of the carrier 31, the charger plunger 16 and knife 15, move back thereby taking into the dough receiving chamber 13 sufficient dough to fill the empty space in the chamber 13. The carrier 31 reaches the upper end of its stroke, with its pocket 30 in alignment with the chamber 13, and before the charging plunger commences its charging stroke, the knife 15 moves forward closing the top of the chamber 13 and trapping the dough therein. The charging plunger 16 then moves forward, forcing the dough into the measuring pocket 30, and against the plunger 39, which is thereby forced back until its roller 39ª encounters the abutment member 40. When the pocket has been completely filled with dough, any surplus dough in the chamber 13 resists the action of the plunger 16, and the upper end of the lever 18 thereupon yields against the action of the spring 23. Consequently, there is no excess or abnormal pressure exerted upon the dough beyond that required to press the necessary amount into the measuring pocket. When the plunger has reached the end of its charging stroke the carrier 31 starts down, cutting off the surplus dough as the pocket passes the discharge end of the chamber 13, and leaving the precise predetermined amount in the pocket, which is thereafter ejected and severed into separate lumps of equal weight.

In the drawings no dough is shown in the chamber 13 or pocket 30, consequently the plunger 16 is shown (in Fig. 3) at the extreme end of its charging stroke, but it's understood that if an excess amount of dough were contained in the chamber 13, the plunger 16 would take a position somewhat to the left of that shown in Fig. 3, and that the upper part 18$^b$ of the lever would be swung back somewhat, as is shown by the dotted lines in Fig. 3.

Whenever the stop 40 for the ejecting plunger 39 is adjusted back of the position shown, for the purpose of increasing the cubical contents of the charge, the excess amount of dough remaining in the chamber 13 will be less after the measuring pocket has been charged, and consequently the plunger will be permitted, by the dough, to move further forward. To maintain approximately the required amount of pressure upon the dough, when charging the measuring pocket, the tension of the spring 23 is adjusted. When smaller loaves are made the tension of the spring is reduced to permit the plunger to yield farther, and when larger loaves are made the tension of the spring is increased since the plunger need not yield back as far as when small loaves are made.

It will be noted that in case an air pocket occurs in a charge of dough drawn into the chamber 13, the air pocket will be spread over or distributed throughout the charge when it is forced into the measuring pocket, and when the charge is divided into two lumps the air pocket disappears into the two lumps instead of remaining in a single lump.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:—

1. In a divider, a receiving chamber having a discharge end, a reciprocatory charging plunger therein, a reciprocatory carrier movable transversely of said receiving chamber, and having a measuring pocket of the same cross section as the receiving chamber capable of registering with the discharge end thereof, means for reciprocating said charging plunger and carrier in timed relation to each other, a stationarily supported dough dividing member external of the chamber and pocket, and located in front of the discharge end of the pocket when the latter is in the position occupied when its contents are being ejected, an ejecting plunger in said pocket, and means for actuating said plunger to eject the contents of the pocket and force it across said dough dividing member.

2. In a divider having a dough receiving chamber, a reciprocatory plunger therein, a reciprocatory dough carrier having a measuring pocket therein, a plunger therein, means for reciprocating said plunger and carrier in timed relation to each other, and means for actuating said ejecting plunger to eject the dough from said pocket, and a dough dividing member located externally of said chamber and pocket and in front of said pocket when the latter is in the position occupied for ejecting the dough therefrom, said dough dividing member having beveled cutting edges increasing in width at their lower ends.

3. In a divider, a dough receiving chamber, a plunger, a plunger operating lever connected to said plunger, and means on one side of said lever for actuating the same, said lever comprising two normally aligned arms having a knuckle joint therebetween, and each arm having a lug extending laterally therefrom on the side opposite the lever actuating means, a coiled compression spring seated on one lug and a spring tension adjusting means mounted on the other lug, said spring extending approximately parallel with said lever and acting to yieldably hold the two arms thereof in alignment.

FRANK STREICH.